United States Patent Office 3,128,284
Patented Apr. 7, 1964

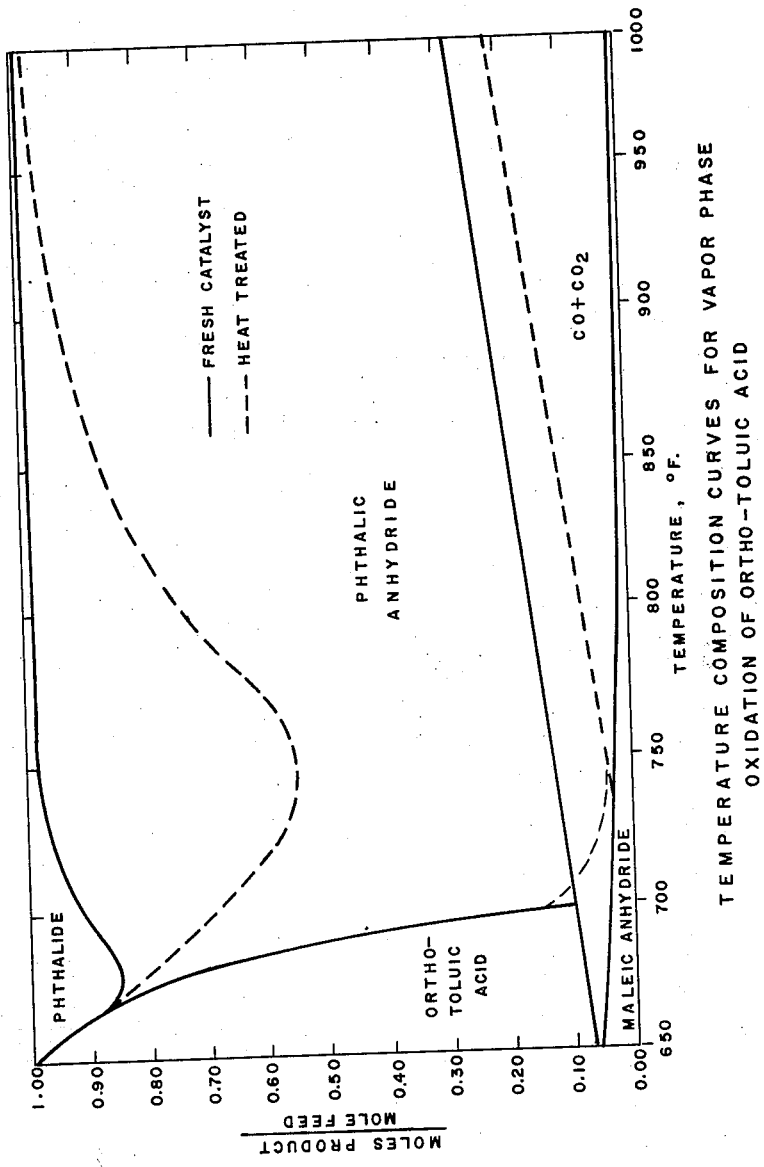

3,128,284
PRODUCTION OF PHTHALIDE
William R. Edwards and Robert D. Wesselhoft, Baytown, Tex., assignors, by mesne assignments, to Esso Research and Engineering Company, Elizabeth, N.J., a corporation of Delaware
Filed Dec. 3, 1962, Ser. No. 241,957
5 Claims. (Cl. 260—343.3)

This invention concerns a method for producing phthalide by the vapor phase catalytic oxidation of o-toluic acid. More particularly, the invention concerns producing phthalide by passing o-toluic acid vapors in admixture with air over a vanadium pentoxide (specifically about 3% to 10% by weight) on corundum catalyst, the catalyst preferably having been pretreated with air at a temperature in the range of about 1500° to 2500° F. Corundum is the naturally occurring form of aluminum oxide and consists of a very hard, low surface area form of alumina.

A primary object of the present invention is to provide an improved method for producing phthalide from an o-toluic acid feed concentrate and especially one in which the amount of phthalide produced is optimized.

One important use for phthalide is as a plasticizer in dynamite.

It has been discovered that by pretreating the vanadium pentoxide on corundum catalyst (by passage of preheated air over the catalyst) from 1 to 30 minutes at a temperature above 1500° F., phthalide will be predominately produced rather than phthalic anhydride. The best conditions for the preparation of phthalide employ an air rate of between 50 to 1 to 500 to 1 mols of air per mol of o-toluic acid (0.2 to 2.0 mol percent o-toluic acid) charged to the reactor, a pressure of 0 to 50 p.s.i., with the reactor positioned in a lead bath to control temperature. Under these same conditions it also has been found that phthalide can be produced from an o-toluic acid feed without pretreating the vanadium pentoxide on corundum catalyst, although the amount of phthalide produced is not optimized in comparison to the amount of phthalic anhydride produced, as in the case where the catalyst is pretreated.

The above object and other objects and advantages of the invention will be apparent from a more detailed description thereof which follows.

The sole figure presents temperature-composition curves for the vapor phase oxidation of o-toluic acid. The selectivity to a component in the reaction product is obtained from the curves by reading the increment between the boundary lines for that particular component.

The composition of the feed used for the experiments to obtain the results shown in the figure is as follows:

Table I

| Component— | Wt. percent |
|---|---|
| o-Toluic acid | 78.1 |
| Phthalic anhydride | 12.3 |
| Phthalide | 6.4 |
| o-Tolualdehyde | 2.2 |
| Dinuclear compounds | 1.0 |
| | 100.0 |

The following ranges of conditions were used to obtain the data:

Table II

| | |
|---|---|
| Liquid hourly space velocity | 0.2–0.4. |
| o-Toluic acid concentration in air | 0.65–1.3 vol. percent. |
| Reactor inlet pressure | 22 p.s.i.g. |
| Reactor outlet pressure | 5 p.s.i.g. |
| Catalyst | 5–6 mesh $V_2O_5$ on corundum (5% $V_2O_5$). |

The solid line curves of the figure indicate product distributions when using fresh catalyst, and the dashed line curves show product distributions using pretreated catalyst.

A typical run for pretreated catalyst is as follows:

Table III

| | |
|---|---|
| Catalyst | Heat treated 5–6 mesh $V_2O_5$ on corundum (pretreated with air at 2000° F.). |
| Temperature, average | 743° F. |
| o-Toluic acid concentration in air | 0.88 mol percent. |
| Feed rate, liquid | 0.25 v./v./hr. |
| Pressure, inlet | 22 p.s.i.g. |
| Product composition: | LVMS, wt. percent |
| Phthalide | 42.6 |
| Phthalic acid+anhydride | 53.9 |
| o-Toluic acid | 1.3 |
| Maleic acid+anhydride | 2.2 |
| Total | 100.0 |

To recover pure phthalide from the product phthalic acid and anhydride which constitute the major impurities, a method such as sodium carbonate extraction of the phthalic acids and anhydride may be employed. As an example, to extract phthalide from a product composition similar to the one of Table III but containing 27.5 wt. percent phthalide, 3.94 g. of the product were dissolved in 37.36 g. of benzene. This solution was extracted three times with saturated sodium carbonate solution to remove acid impurities. The remaining benzene was subjected to vacuum evaporation and 0.88 g. of solid material, pure phthalide, was left as residue representing an 81% yield of phthalide from the starting material.

The following run is illustrative of the production of phthalide from the o-toluic acid concentrate feed without pretreating the catalyst:

Table IV

| | |
|---|---|
| Catalyst | 5–6 mesh $V_2O_5$ on corundum (5% $V_2O_5$). |
| Temperature, average | 680° F. |
| o-Toluic acid concentration in air | 0.86 mol percent. |
| Feed rate, liquid | 0.25 v./v./hr. |
| Pressure, inlet | 22 p.s.i.g. |
| Product composition: | LVMS, wt. percent |
| Phthalide | 16 |
| Phthalic acid+anhydride | 12 |
| o-Toluic acid | 63 |
| Maleic acid+anhydride | 5 |
| $CO+CO_2$ | 4 |
| Total | 100 |

The phthalide may be obtained from this product in the previously described manner of sodium carbonate extraction.

Having fully described the method, objects, advantages and nature of our invention, we claim:

1. A process for producing phthalide comprising passing o-toluic acid vapors in admixture with air in concentrations ranging between 0.2 and 2.0 mol percent o-toluic acid at a temperature ranging between about 675° and 850° F. at a pressure of 0 to 50 p.s.i.g. and at a rate of 0.05 to 1 liquid v./v./hr. across a $V_2O_5$ on $Al_2O_3$ catalyst preheat-treated with air at a temperature in the range of 1500° F. to 2500° F. for from 1 to 30 mins.

2. A process as recited in claim 1 wherein said reaction temperature is about 740° F.

3. A process for producing phthalide comprising passing o-toluic acid vapors in admixture with air across a $V_2O_5$ on $Al_2O_3$ catalyst in concentrations ranging between 0.2 and 2.0 mol percent o-toluic acid at a temperature ranging between about 660° and 725° F. at a pressure of 0 to 50 p.s.i.g. and at a rate of 0.05 to 1 liquid v./v./hr.

4. A process as recited in claim 3 wherein said reaction temperature is about 690° F.

5. A process for producing phthalide comprising passing o-toluic acid vapors in admixture with air in concentrations ranging between 0.2 and 2.0 mol percent o-toluic acid at a temperature ranging between about 675° and 850° F. across a $V_2O_5$ on $Al_2O_3$ catalyst pretreated with air at a temperature greater than 1500° F.

No references cited.